United States Patent
Gazdik

(10) Patent No.: US 6,708,932 B1
(45) Date of Patent: Mar. 23, 2004

(54) CABLE RETAINER FOR SIDED STRUCTURE

(76) Inventor: Charles Gazdik, 5545 Pathfinder, Casper, WY (US) 82604

( * ) Notice: Subject to any disclaimer, the term of this patent is extended or adjusted under 35 U.S.C. 154(b) by 0 days.

(21) Appl. No.: 10/002,509

(22) Filed: Nov. 1, 2001

(51) Int. Cl.$^7$ .................................................. F16L 3/00
(52) U.S. Cl. .............................. 248/74.1; 248/71
(58) Field of Search ................... 248/49, 65, 74.1, 248/71, 315, 316.2, 221.13, 229.21, 228.2, 231.31; 81/44, 447, 448

(56) References Cited

U.S. PATENT DOCUMENTS

| | | | |
|---|---|---|---|
| 875,533 A | * 12/1907 | Lane | |
| 2,309,261 A | * 1/1943 | Tallman | 248/71 |
| 3,154,281 A | * 10/1964 | Frank | 248/201 |
| 3,266,761 A | * 8/1966 | Walton et al. | 248/71 |
| 3,323,568 A | * 6/1967 | Schmidt | 145/46 |
| 4,260,123 A | * 4/1981 | Ismert | 248/74 R |
| 4,828,504 A | 5/1989 | Franks, Jr. | 439/92 |
| 4,884,976 A | 12/1989 | Franks, Jr. | 439/92 |
| 4,925,395 A | 5/1990 | Franks, Jr. | 439/100 |
| 5,015,205 A | 5/1991 | Franks, Jr. | 439/803 |
| 5,094,622 A | 3/1992 | Auclair | 439/92 |
| 5,597,280 A | * 1/1997 | Stern | 411/508 |
| 5,622,352 A | * 4/1997 | Swindoll | 254/26 E |
| 5,738,313 A | 4/1998 | Rinke | 248/74.2 |
| 5,873,550 A | * 2/1999 | Phillips | 248/73 |
| 6,021,982 A | 2/2000 | Mangone, Jr. | 248/74.5 |
| 6,149,108 A | * 11/2000 | Weickenmeier et al. | 248/74.1 |
| 6,311,934 B1 | * 11/2001 | Fujii et al. | 248/73 |
| 6,378,814 B1 | * 4/2002 | Kaplan | 248/71 |

* cited by examiner

*Primary Examiner*—Korie Chan
*Assistant Examiner*—Steven Marsh
(74) *Attorney, Agent, or Firm*—John D. Gugliotta; P. Jeff Martin

(57) ABSTRACT

A cable retainer for sided structures is an apparatus to secure and hold low-voltage and data-type cables to clapboards on the side of a residential or commercial structure. A clip type arrangement is used that slides between the boards where they overlap one another. The clip can be pushed in with a special tool or hammered in as well. The side of the clip is provided with plastic barbs which aid in retaining the invention. The bottom contains a "U"-shaped clip that holds smaller cables and another version of the invention has a slit which is used with a conventional cable-tie for retaining larger or multiple cables. Placed approximately every four feet, any type of cable is neatly held without sagging. If the cable is removed, the clip is supplied with a pre-scored mark that allows the bottom portion of the invention to be snapped off and removed while leaving the concealed upper portion in place.

10 Claims, 2 Drawing Sheets

CABLE RETAINER FOR SIDED STRUCTURE

RELATED APPLICATIONS

The present invention was first described in Disclosure Document Registration 493,779 filed on May 18, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to low voltage cables and wiring and, more particularly, to a cable retainer for sided structure and installation tool therefore.

2. Description of the Related Art

Due to the proliferation of telephones, fax machines, modems, computer networks, satellite systems, cable television networks and the like, the cables that make these systems work are everywhere and more are being installed every day. A common method of installing these cables is along the exterior of a residential or commercial structure and then poking through the wall where needed. While this method certainly works, it is certainly not aesthetically pleasing. The clips or fastener are often screwed or nailed directly to the siding. This process requires much time to install, and should it be removed at another date, unsightly holes are left behind. Also, the fasteners tend to pop off with time allowing the cable to sag. This also subjects the cable to greater risk of damage, thus affecting the integrity of the communication circuit as well.

A search of the prior art did not disclose any patents that read directly on the claims of the instant invention; however, the following references were considered related.

The following patents disclose a clamp for electrically-conductive strips:

U.S. Pat. No. 4,884,976 issued in the name of Franks, Jr.

U.S. Pat. No. 4,828,504 issued in the name of Franks, Jr.

U.S. Pat. No. 6,021,982 issued in the name of Mangone, Jr. describes a cable clip for attaching a cable to a support.

U.S. Pat. No. 5,738,313 issued in the name of Rinke discloses a cable holder for use in conjunction with a boat having a deck handrail.

U.S. Pat. No. 5,094,622 issued in the name of Auclair describes a cable rack bond clamp.

U.S. Pat. No. 5,015,205 issued in the name of Franks, Jr. discloses a telephone cable lashing wire clamp.

And, U.S. Pat. No. 4,925,395 issued in the name of Franks, Jr. describes an underground clamping device for electrically-conductive strips.

Consequently, a need has been felt for providing an apparatus and method of by which low-voltage and communication cables can be quickly and securely attached to the exterior of a sided structure without the disadvantages as listed above.

SUMMARY OF THE INVENTION

It is therefore an object of the present invention to provide an improved apparatus and method of by which low-voltage and communication cables can be quickly and securely attached to the exterior of a sided structure.

It is a feature of the present invention to provide an improved cable retainer particularly adapted for installation on a sided structure. It is a further feature of the present invention to provide an installation tool therefore.

Briefly described according to one embodiment of the present invention, a cable retainer for sided structures is an apparatus to secure and hold low-voltage and data-type cables to clapboards on the side of a residential or commercial structure. The invention uses a clip type arrangement that slides between the boards where they overlap one another. The invention is made of hard plastic, but contains a sharp metal point to aid in the insertion process. The invention can be pushed in with a special tool or hammered in as well. The side of the clip is provided with plastic barbs which aid in retaining the invention. The bottom of the invention contains a "U"-shaped clip that holds smaller cables and another version of the invention has a slit which is used with a conventional cable-tie for retaining larger or multiple cables. The invention would be placed approximately every four feet to neatly hold any type of cable without sagging. If the cable is removed, the invention is supplied with a pre-scored mark that allows the bottom portion of the invention to be snapped off and removed while leaving the concealed upper portion in place.

The use of the Cable Retainer for Sided Structures provides cable installers a quick, easy and effective means for supporting cables from the exterior of wood or metal sided structures.

An advantage of the present invention is that it can be used easily on sided structures having horizontal clapboards to hold telephone, cable, data and similar cables.

Another advantage of the present invention is that it provides for a neat appearance of such cables.

Yet another advantage of the present invention is that it provides for such installation without the need for power tools during installation.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
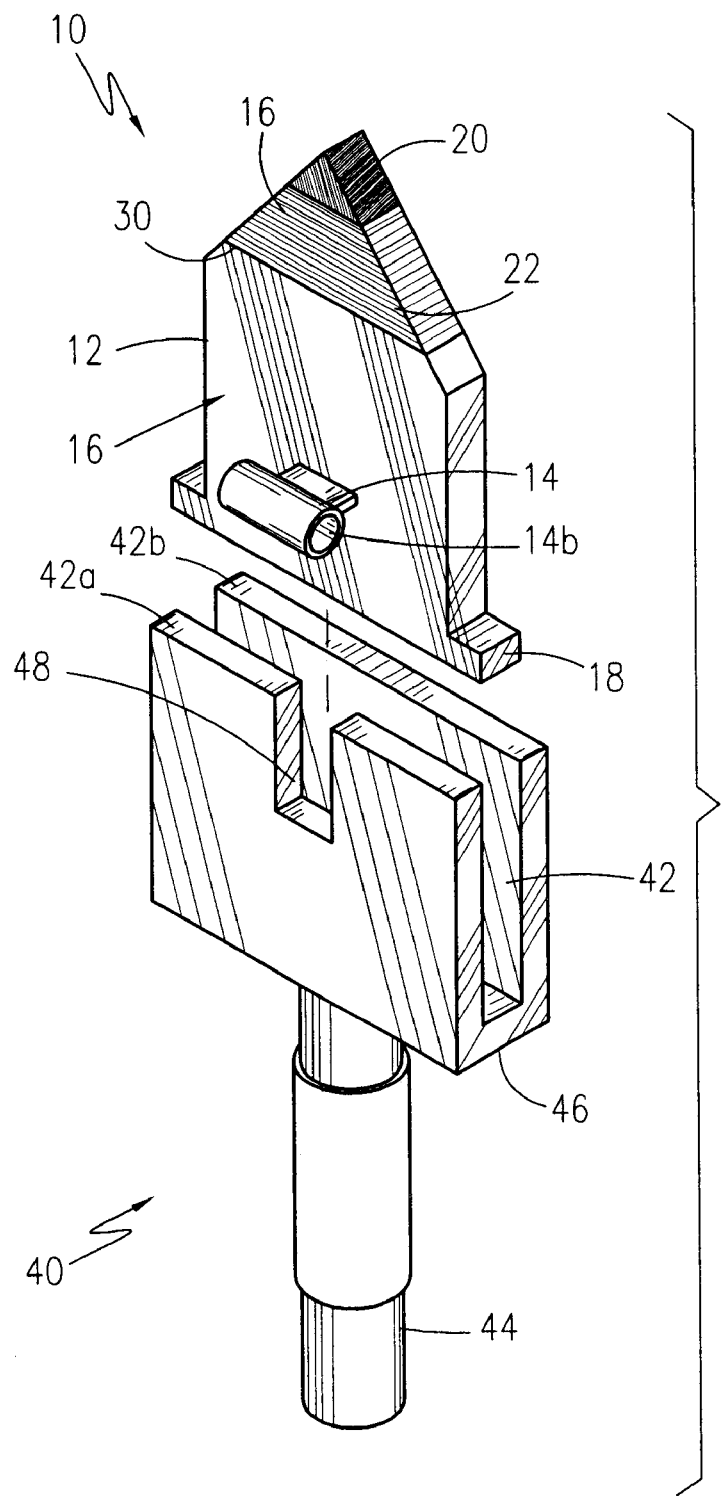
FIG. 1 is a perspective view of a cable retainer in combination with an installation tool according to the preferred embodiment of the present invention.
Figure 2:
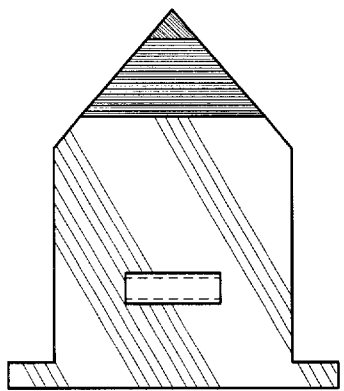
FIG. 2 is a top plan view of the cable retainer thereof.
Figure 3:
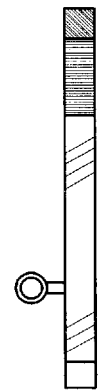
FIG. 3 is a side elevational view thereof.

Referring now to FIGS. 1–5, a cable retainer 10 in combination with an installation tool 40 is shown, according to the present invention. The cable retainer 10, shown in greater detail in FIGS. 1–3, is formed of a guide member formed of a support plate 12, a cylindrical guide 14, and a securement means 16. The support plate 12 is formed of a generally flat, planar member having a support surface 17 for affixing the cylindrical guide 14 thereto. Shown herein as a generally rectangular flat plate, the support plate 12 has a driving head 18 formed along its lowermost surface and opposite the securement means 16 that is planarly aligned with the support plate 12 and opposite the head 18. The cylindrical guide 14 is envisioned as a horizontally aligned, cylindrical tube having an outer sidewall surrounding and forming a cable holding conduit 14b. The securement means 16 is shown herein as a tapered extension of the support plate 12 terminating at an insertion tip 20, and having a gripping surface 22 therebetween along the outer surfaces.

Additionally, a removal score 30 is anticipated as being a horizontally disposed channel 32 formed between the support plate 12 and securement means 16 to allow separation of the support plate 12 upon application of sufficient laterally applied strain.

Figure 4:
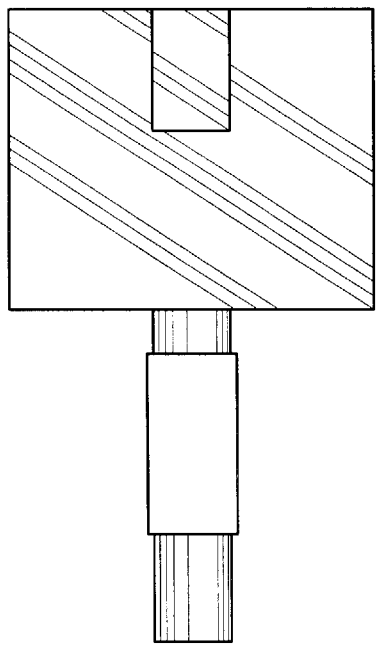
FIG. 4 is a top plan view of the installation tool thereof.
Figure 5:
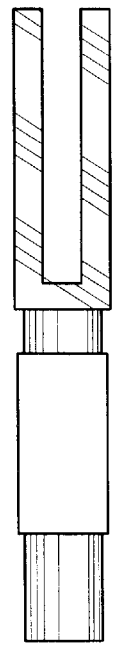
FIG. 5 is a side elevational view thereof.

In FIG. 1, in conjunction with FIGS. 4–5, the installation tool 40 is shown in greater detail as a slotted tool used to drive and remove the cable retainer. As shown, a receiving head 42 is affixed to an urging member 44 extending downward therefrom along the vertical centerline of the installation tool 40. The receiving head 42 is formed of a front head plate 42a mounted parallelly to and offset from a rear head plate 42b via a receiving head base plate 46 such as to form a support plate receiving cavity therebetween. The front head plate 42a further forms a receiving slot 48 for accepting passage of the guide 14 when the guide member is placed within the installation tool 40. The urging member 44 is anticipated as being a hammering base, allowing for driving of the tool by striking with a hammer or similar hand tool.

2. Operation of the Preferred Embodiment

In accordance with a preferred embodiment of the present invention, as shown in FIG. 1, the cable holder 10 is placed such that the insertion tip 20 is wedged between two vertical surface, such as siding clapboards. Driving the gripping surface 22 between such clapboards using the installation tool 40, the support plate 12 remains accessible with the cable guide 14 exposed horizontally. A plurality of such cable holders 10 are installed in a similar manner, thereby allowing for passage of cable or wire through the cable conduits 14b of the cylindrical guides 14. Should the user desire removal, application of an upward pulling strain on the support plate 12 will allow separation of the support plate 12 from the securement means 16 along the removal score 30.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A cable retainer for sided structures comprising:

a guide member adapted for use on sided buildings;

said guide member comprising a support plate having a generally flat, planar member having a support surface for affixing a cylindrical guide thereto;

a driving head formed along a lowermost surface of said planar member and opposite a securement means;

said securement means being in the same plane with the support plate and opposite said driving head; whereby said securement means is adapted to be wedged between sliding clapboards of a building;

the cylinder guide affixed to said support plate;

the securement means extending from said support plate; and an installation tool for use in combination with said cable retainer.

2. The cable retainer of claim 1, wherein said cylindrical guide comprises a horizontally aligned, cylindrical tube having an outer sidewall surrounding and forming a cable holding conduit.

3. The cable retainer of claim 1, wherein said securement means comprises a tapered extension of said support plate and terminating at an insertion tip.

4. The cable retainer of claim 3, wherein said securement means further comprises a gripping surface along an outer surface.

5. The cable retainer of claim 1, further comprising a removal score forming a horizontally disposed channel formed between said support plate and said securement means for allowing separation of said support plate upon application of sufficient laterally applied strain.

6. The cable retainer of claim 1, wherein said installation tool comprises a slotted tool used to drive and remove said cable retainer.

7. The cable retainer of claim 6, wherein said installation tool comprises a receiving head affixed to an urging member extending downward therefrom along a vertical centerline.

8. The cable retainer of claim 7, wherein said receiving head comprises a front head plate mounted parallel to and offset from a rear head plate via a receiving head base plate such as to form a support plate receiving cavity therebetween.

9. The cable retainer of claim 8, wherein said front head plate further forms a receiving slot.

10. The cable retainer of claim 7, herein said urging member comprising a hammering base, allowing for driving of the tool by striking with a hammer or similar hand tool.

* * * * *